United States Patent

[11] 3,576,548

[72] Inventor George A. Watson
588 Glenrose, Orange, Calif. 92667

[21] Appl. No. 789,226
[22] Filed Jan. 6, 1969
[45] Patented Apr. 27, 1971

[54] FIXED MEMORY SYSTEM USING FIELD EFFECT DEVICES
6 Claims, 2 Drawing Figs.

[52] U.S. Cl. .......... 340/173,- 340/174(TB), 340/174(SP)
[51] Int. Cl. .......... G11c 7/00, G11c 17/00
[50] Field of Search .......... 340/173, 174, 166, 147 (T); 307/243, 244

[56] References Cited

UNITED STATES PATENTS

| | | | |
|---|---|---|---|
| 1,547,964 | 7/1925 | Semat | 340/147X |
| 2,386,482 | 10/1945 | Leathers et al. | 340/147X |
| 2,405,603 | 8/1946 | Parker et al. | 340/147X |
| 2,844,811 | 7/1958 | Burkhart | 340/166 |

*Primary Examiner*—Stanley M. Uryowicz, Jr.
*Attorneys*—William R. Lane, L. Lee Humphries and Robert G. Rogers

ABSTRACT: Address selection matrix terminals in a fixed memory encode *n* bits of data per terminal by connecting each terminal to one of $2^n$ coding lines. Each coding line corresponds to a specific *n* bit code, as well as to a logical function of the address bits not used in the address selection matrix. The multiple coding lines reduce the size of the address selection matrix by a factor of *n*.

Control means including field effect transistors representing the functions of the remaining address bits electrically connect the coding lines to the output terminal.

INVENTOR.
GEORGE A. WATSON
BY Robert G Rogers
ATTORNEY

FIXED MEMORY SYSTEM USING FIELD EFFECT DEVICES

BACKGROUND OF THE INVENTION

1. Field of the Invention

This invention relates to a fixed memory system using field effect devices and, more particularly, to an addressable memory system in which logic functions of certain address variables (least significant address bits) select coding lines.

2. Description of Prior Art

Various schemes have been conceived for mechanizing fixed memory systems. For example, semiconductor devices, arrays of semiconductor diodes, resistors, transistors and MOS FET's have been suggested as the storage medium for such a system.

The semiconductor fixed memory mechanizations usually require the connection or nonconnection of a semiconductor element as a means for storing data. In a diode array, for example, a connection of a diode from a decoded input line to an output line can represent a logic 1. If the diode is not connected, the data is a logic 0. In order to store 2,000 bits of information, at least 2,000 diode connection locations must be available in the array. Additional circuitry is usually necessary in order to select the location of the data to be read out.

Each output line in a fixed memory is characterized by a logic equation which specifies the output data as a function of the memory address bits. This equation can be written for a 2048-bit memory in the following general form, where each term corresponds to 1-bit of stored data.

$$\begin{aligned}\Phi = {} & d_0\bar{a}_{11}\bar{a}_{10}\bar{a}_9\bar{a}_8\bar{a}_7\bar{a}_6\bar{a}_5\bar{a}_4\bar{a}_3\bar{a}_2\bar{a}_1 \\ & + d_1\bar{a}_{11}\bar{a}_{10}\bar{a}_9\bar{a}_8\bar{a}_7\bar{a}_6\bar{a}_5\bar{a}_4\bar{a}_3\bar{a}_2 a_1 \\ & + d_2\bar{a}_{11}\bar{a}_{10}\bar{a}_9\bar{a}_8\bar{a}_7\bar{a}_6\bar{a}_5\bar{a}_4\bar{a}_3 a_2\bar{a}_1 \\ & + \cdots \\ & + d_{613}\bar{a}_{11}a_{10}\bar{a}_9\bar{a}_8 a_7 a_6\bar{a}_5\bar{a}_4 a_3\bar{a}_2 a_1 \\ & + \cdots \\ & + d_{2047}a_{11}a_{10}a_9a_8a_7a_6a_5a_4a_3a_2a_1\end{aligned}$$

where $\Phi$ = output data function $d_j$ = stored data at j $a_i$ = address bit i $\bar{a}_i$ = complement of ai.

Typically, a fixed memory is mechanized by decoding the address bits and their complements in an address matrix to form all the possible terms in the above equation. Then the data is stored by selectively connecting elements corresponding to the aforementioned terms in the address matrix to the output line.

For example, consider a typical 2048-bit fixed memory mechanized with MOS FET's. An input line, usually connected to a voltage level such as electrical ground, is connected to 2048 nodes through the sources and drains in an array of MOS FET's. Other voltage levels may be used. The gates of the MOS FET's are connected to the address lines or their complements, or functions of the address lines, such that there is a low impedance path through the array from the input to one and only one of the 2048 nodes. The array, therefore, permits selection of one of the nodes under control of the address lines.

Data is stored by connecting certain nodes to an output line. If an address location is to store a logic 1, the node selected by that address is connected to the output line. If a 0 is to be stored, the node is not connected.

In a large scale integration MOS memory chip, the chip topology is usually layed out to accommodate any possible data pattern. A specific data pattern is encoded by making or not making connections between the nodes and the output line. This means that regardless of the data eventually encoded in the chip, all 2048 nodes must be mechanized on the chip as well as the full array of MOS FET's required to select all 2048 nodes. Each node requires a certain amount of area on the chip to mechanize, and the total size of the chip is dependent on the number of nodes. Since the cost of the chip is related to its size, it follows that the cost of the chip is also related to the number of nodes.

SUMMARY OF THE INVENTION

Briefly, the system provides a unique mechanization for a selected number of address variables of a memory for reducing the number of address terminals and selection devices required for a particular fixed memory implementation. The number of nodes, or address terminals, is reduced by a factor *n* and each node is connected in such a way as to encode *n* bits of data. As a practical matter, for most memory systems, *n* would be equal to 2 or 4.

For example, the last two address bits of an address matrix having 11 address bits may be implemented by 16 coding lines representing the 16 logic functions of the two address bit variables. The address matrix for the remaining address bits would not change. Control devices between each of the 16 coding lines and a common input terminal correspond to the 16 possible functions of the two address variables.

For the example described, since the last two address bits are implemented by 16 addressable lines, only 512 address matrix terminals are required for connection to the 16 lines. If the last two address bits had not been implemented as described, 2,048 matrix terminals and additional selection devices would have been required.

Since the geometry of a chip used in producing selection devices such as MOS devices is, to an extent, determined by the number of address terminals at the input end of the address matrix, a reduced number of lines improves the chip's geometry. In addition to reducing the size of a chip, the implementation also reduces the number of gates (of field effect devices) and contact points required for a particular fixed memory.

Although the above example selected two address bits for being implemented as described, it should be obvious that other numbers of address bits can be selected and implemented in the same manner. For example, three bits have 256 possible variables so that instead of 16 lines for the above example, 256 lines would be required. Obviously, as the number of address bits implemented in the manner described increases, the number of lines similarly increases so that the advantages to be derived from the new scheme may be balanced by the increased number of lines for the higher numbers of address bits.

Therefore, it is an object of this invention to reduce the number of contacts required to implement a fixed memory by providing lines to represent a selected number of address variables of the fixed memory.

It is another object of this invention to provide an improved fixed memory having a maximum number of storage bits implemented by a reduced number of address connections.

Still a further object of this invention is to provide a fixed memory having a reduced number of matrix address lines and address selection devices for reducing the power consumption by a memory system.

It is still a further object of this invention to provide a fixed memory implemented by replacing a number of field effect devices with a unique combination of controlled input lines.

Still a further object of the invention is to provide a fixed memory having a relatively high bit packing density by reducing the number of connections required to address selected bit locations.

These and other objects of the invention will become more apparent when taken in connection with the description of the drawing, a brief description of which follows:

DESCRIPTION OF PREFERRED EMBODIMENTS

Figure 1:
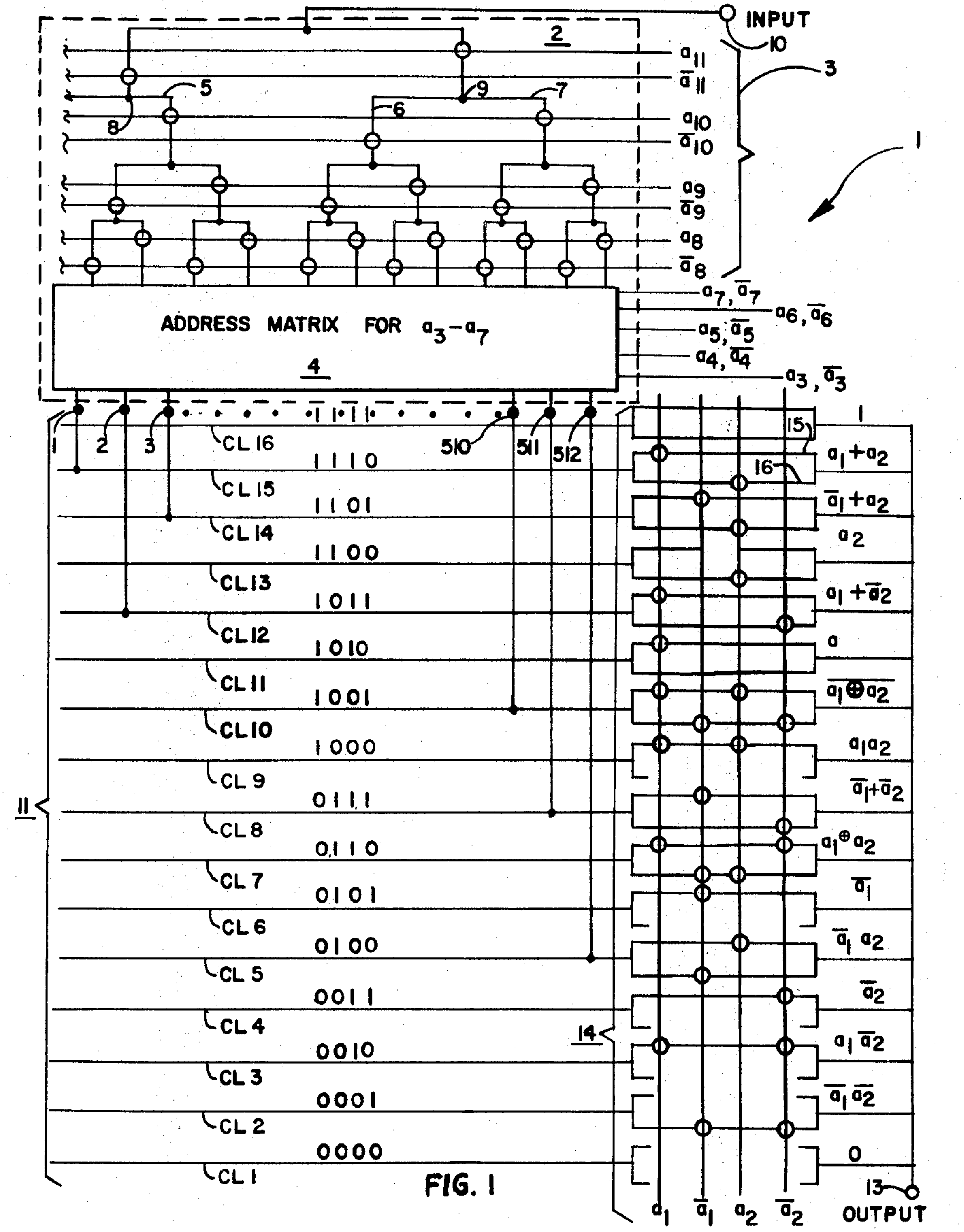
FIG. 1 illustrates one embodiment of a fixed memory system in which the two least significant address variables are implemented by input lines and control devices between a common input terminal and each line.

The FIG. illustrates one embodiment of a fixed memory 1 comprising address matrix 2 for the most significant bits of address variables $a_1$ through $a_{11}$ and $\overline{a_1}$ through $\overline{a_{11}}$. Portion 3 of the address matrix for bits $a_8$ through $a_{11}$, including $\overline{a_8}$ through $\overline{a_{11}}$ is shown in detail whereas the other portion 4 of the address matrix, $a_3$ through $a_7$, is shown in block diagram form. A single line is used to represent lines for each of the address variables $a_3$ and $\overline{a_3}$ and $a_7$ and $\overline{a_7}$. The implementation of the address matrix portion would be a continuation of the implementation shown in connection with address bits $a_8$ through $a_{11}$ (and $\overline{a_8}$ through $\overline{a_{11}}$).

The address matrix 2 for memory 1 is implemented in accordance with a binary code. Beginning with input terminal 10, each address line of the matrix is consecutively divided until terminals for all address locations have been produced. For the particular embodiments shown only 512 terminals are necessary as indicated above in the brief summary and as described subsequently herein. Although the embodiment shown uses a binary code implementations according to other numerical codes are also possible and within the scope of the invention.

It is pointed out, that three selection trees 5, 6, and 7 are shown for portion 3 of the address matrix 2. An additional selection tree is omitted for convenience. The additional selection tree would be connected to point 8 of selection tree 5 and would be similar in structure to the selection tree 6 shown connected to point 9 of selection tree 7.

The address matrix 2 has a number of terminals 1 through 512 which are equal to the number of states of the address variables $a_3$ through $a_{11}$. Only the outer terminals 1, 2, 3,...510, 511, and 512 are shown for convenience. The missing terminals are represented by dots.

Selected address variables $a_1$, $\overline{a_1}$, $a_2$, and $\overline{a_2}$ are represented by 16 coding lines, generalized by numeral 11. The lines are equal to the logic functions of the $a_1$, $\overline{a_1}$, $a_2$, and $\overline{a_2}$ address bits. As indicated previously, other numbers of address variables may be selected although in the preferred embodiment, the least two significant bits of all of the address variables $a_1$ through $a_{11}$ and $\overline{a_1}$ through $\overline{a_{11}}$ were selected. In effect, the coding lines 11 and address matrix 2 form an address circuit for the memory 1.

The selection of the specific number of address bits depends on the number of address locations. As the number of address locations increases, it is feasible to select a higher number of address bits to be mechanized as described above. As the number of address locations decreases, it becomes less feasible to mechanize a high number of address bits. For example, in the 11 address bit memory, the number of possible connections is reduced from 2,048 to 512 by providing 16 lines representing the address locations of the last two address bits. In order to mechanize three bits, 256 lines would have to be provided and the number of possible connections would be reduced even further. However, it should be obvious that the number of additional lines has also substantially increased. If four address bits are mechanized, 6,500 additional lines would have been required so that the advantages of using the scheme are drastically curtailed as the number of bits implemented increases.

For each matrix terminal, 1—512, there corresponds a unique set of four addresses. The sets are represented by the states of the most significant address variables and the four addresses at the terminals, are further delineated by the two least significant address bits $a_1$, $\overline{a_1}$, $a_2$ and $\overline{a_2}$. To each set of four addresses, there corresponds four data bits which are to be stored in the memory 1. For a given matrix terminal, the four data bits are a logical function of the two least significant address bits. A coding line is mechanized for each of the 16 possible logical functions of the two least significant address bits. Data is stored in memory 1 by connecting each matrix terminal to one of the input lines according to the data to be stored at the corresponding set of four addresses. For example, terminal 512 is shown connected to the 12th input line which mechanizes the logical function $a_1$ and $a_2$. When the address variables $a_3$ through $a_{11}$ are true, matrix terminal 512 is connected to the input terminal 10. A single data bit (logic 1 or 0) can be read out for each address ($a_1a_{11}$).

The four memory addresses corresponding to matrix terminal 512 have as their least significant address bits $a_1a_2$, $a_1a_2$, $a_1a_2$ and $a_1a_2$. The configuration stored by the coding line CL9 is false for $a_1a_2$, $a_1a_2$, and $a_1a_2$, but is true for $a_1a_2$. Therefore, the data stored is three logical 0's and one logical 1.

The 16 coding lines 11 are connected to output terminal 13 through MOS control circuit 14. The data can be considered to be stored in the form of electrical continuity between the input and output terminals, or stored such as to give a voltage at the input terminal 10 corresponding to a logic 1 when the input terminal is connected to a voltage corresponding to a logic 1.

The configuration of the control circuit 14 is such as to mechanize the 16 possible functions of the two least significant address variables. These two address variables have four states, and each function is true or false depending on the state specified in the memory address. The 16 functions mechanized by the coding lines are not mutually exclusive; in fact, for each state, 8 coding lines are true and 8 coding lines are false.

In order to implement certain of the logic functions of $a_1$, $a_1$, $a_2$, and $a_2$, it was necessary to provide parallel lines between the output terminal 13 and the 16 coding lines 11. For example, in order to implement the logic function $a_1+a_2$ two control lines 15 and 16 are provided. Therefore, if either $a_1$ or $a_2$ becomes true for a particular address, the output 13 would be set to the voltage level of the input terminal. For example if $a_1$ is true, an electrical path exists between input terminal 10 and output terminal 13. If input terminal 10 has a voltage level equal to $V$, the output terminal 13 is set to that voltage level.

In order to specify four bits of data per node or terminal, 16 connection possibilities per node are provided. That is, each node is connected to one of 16 coding lines, and these 16 coding lines are accessible to all nodes. Each of the 16 coding lines represent one of the 16 four-bit patterns 0000 through 1111.

The single desired output bit is further selected by the two remaining address bits according to the following table.

TABLE I

| Coding line | $a_1a_2$ | $\bar{a}_1a_2$ | $a_1\bar{a}_2$ | $\bar{a}_1\bar{a}_2$ | Function |
|---|---|---|---|---|---|
| 16 | 1 | 1 | 1 | 1 | 1 |
| 15 | 1 | 1 | 1 | 0 | $a_1+a_2$ |
| 14 | 1 | 1 | 0 | 1 | $\bar{a}_1+a_2$ |
| 13 | 1 | 1 | 0 | 0 | $a_2$ |
| 12 | 1 | 0 | 1 | 1 | $a_1+\bar{a}_2$ |
| 11 | 1 | 0 | 1 | 0 | $a_1$ |
| 10 | 1 | 0 | 0 | 1 | $\overline{a_1\oplus a_2}$ |
| 9 | 1 | 0 | 0 | 0 | $a_1a_2$ |
| 8 | 0 | 1 | 1 | 1 | $\bar{a}_1+\bar{a}_2$ |
| 7 | 0 | 1 | 1 | 0 | $a_1\oplus a_2$ |
| 6 | 0 | 1 | 0 | 1 | $\bar{a}_1$ |
| 5 | 0 | 1 | 0 | 0 | $\bar{a}_1a_2$ |
| 4 | 0 | 0 | 1 | 1 | $\bar{a}_2$ |
| 3 | 0 | 0 | 1 | 0 | $a_1\bar{a}_2$ |
| 2 | 0 | 0 | 0 | 1 | $\bar{a}_1\bar{a}_2$ |
| 1 | 0 | 0 | 0 | 0 | 0 |

Suppose, for example, that the selected node is connected to coding line, CL7. This specifies the four bits of stored data at that node to be as shown below. Any node connected to coding line CL7 also has the same data stored.

| $a_2$ | $a_1$ | data |
|---|---|---|
| 1 | 1 | 0 |
| 1 | 0 | 1 |
| 0 | 1 | 1 |
| 0 | 0 | 0 |

Coding line CL7 is connected to the output 13 through a logic gate mechanizing the function $a_1\oplus a_2$. Each of the 16 coding lines is connected to the output through a logic gate mechanizing the function shown in Table I. It is now obvious that the function for coding line CL1 is an open circuit, and coding line CL1 can, therefore, be omitted.

Figure 2:
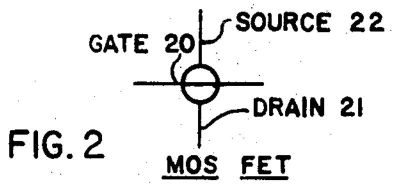
FIG. 2 is an illustration of the symbol used to represent a field effect transistor.

It is pointed out that the circles shown in the figure represent MOS devices having control electrodes represented by lines passing through the circles. If a line representing a control electrode is high, by a threshold of the MOS device, then the MOS device is turned on so that one electrode is driven to the voltage level which appears on the other electrode, minus the resistance drop within the device. FIG. 2 illustrates the electrodes of a MOS field effect transistor including gate electrode 20, source and drain electrodes 21 and 22 respectively.

It should also be understood that the ground levels described herein generally represent false logic levels. In other embodiments, the false logic levels may be represented by positive or negative voltage levels. In that case, the true voltage levels appearing on the output electrodes would have a value which would be relatively different.

It should be understood that although MOS switching devices have been illustrated and described, other switching devices such as MNS devices, MNOS devices and other enhancement mode field effect devices can also be used.

While there has been shown what is considered to be the preferred embodiment of the present invention, it will be manifest that many changes and modifications may be made therein, without departing from the essential spirit of the invention. It is intended, therefore, in the annexed claims, to cover all such changes and modifications as may fall within the true scope of the invention.

I claim:

1. A memory system having addresses represented by a plurality of address bits, said system comprising a common input terminal, and a common output terminal, coding lines equal to the logic functions of selected address variables, *n*, of said address bits, where *n* is an integer greater than 1, each of said coding lines representing *n* bits of stored data;

a field effect transistor address matrix including address matrix terminals equal to the number of states of the remaining address variables of said address bits, said terminals being connected to said common input terminal as a function of a particular address;

means for connecting selected ones of said matrix terminals to selected ones of said coding lines for storing data at the address represented by said selected address matrix terminal; and a plurality of control field effect transistors implementing logic gates representing the logic functions of said selected address variables, said plurality of control field effect transistors being connected between each of the coding lines and said common output terminal for enabling addressed ones of said address matrix terminals to be electrically connected to said output terminal through said coding lines when the control field effect transistors of the corresponding logic function of said selected address variables are actuated.

2. The combination recited in claim 1 including means for actuating selected ones of said plurality of control field effect transistors as a function of a particular address for connecting the logic state of said input terminal through one of said coding lines to said output terminal.

3. The combination recited in claim 1 wherein the number of coding lines is less than the number of address matrix terminals, said coding lines reducing the number of required address matrix terminals by a factor of *n*, where *n* is an integer at least equal to 2.

4. The combination recited in claim 1 wherein each address matrix terminal is connectable to one of $2^n$ coding lines where *n* is an integer at least equal to 2.

5. The combination recited in claim 1 wherein said plurality of control field effect transistors comprise MOS devices each having a control electrode for turning the MOS devices on as a function of a selected address.

6. The combination recited in claim 5 wherein said address matrix is comprised of controlled lines increasing from said common input terminal to said matrix terminals as a function of a selected numerical code, wherein each of said control lines include control electrodes of field effect transistors implementing the address matrix for turning said field effect transistors on as a function of a selected address.